March 14, 1939.  P. K. FROLICH ET AL  2,150,370
POLYMERIZED FATTY OIL
Filed Oct. 3, 1935
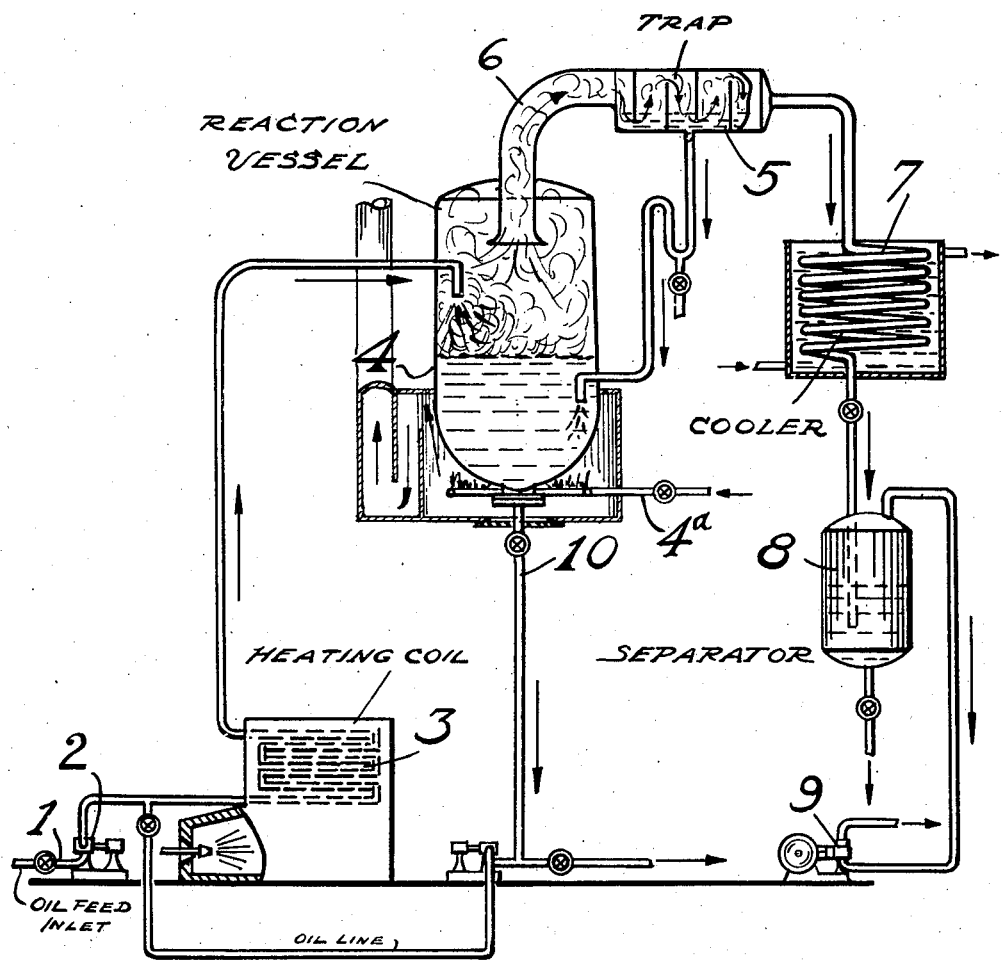
Per K. Frolich
Jones I. Wasson  Inventors
By P. L. Young Attorney Patented Mar. 14, 1939

2,150,370

UNITED STATES PATENT OFFICE 2,150,370

POLYMERIZED FATTY OIL

Per K. Frolich, Westfield, and Jones I. Wasson, Elizabeth, N. J., assignors to Standard Oil Development Company, a corporation of Delaware Application October 3, 1935, Serial No. 43,326

9 Claims. (Cl. 87—9)

The present invention relates to the art of producing valuable lubricating oils and more specifically to a method for increasing the viscosity of hydrocarbon oils by the addition of polymerized or thickened fatty oils and to such polymers and their mixtures with mineral lubricating oils, likewise to an improved method for polymerizing such fatty oils. The invention in its various phases will be fully understood from the following description and the drawing which represents an advantageous method for carrying out the process.

The drawing is a diagrammatic view in sectional elevation showing the operation throughout.

It has long been realized that drying oils can be polymerized by heat and this phenomenon has been of considerable importance in the paint and varnish industry. The so-called boiled oils are polymerized to a substantial degree but they are prepared from rapidly drying oils and are not miscible with or soluble in hydrocarbon lubricating oils. Furthermore, they are not stable but gradually thicken further by the addition of oxygen quickly producing solid films. This is particularly the case with linseed and tung oil. The lower polymerized products of these oils in particular are still soluble in mineral lubricating oils, but as molecular weight increases they become more and more difficultly soluble. When the viscosity reaches 1000 to 1500 seconds Saybolt at 210° F. they become quite insoluble in lubricating oils and are useless for present purposes.

The present invention is quite similar to the boiling of drying oils but differs in that the initial materials belong to the less unsaturated group known as the unsaturated non-drying and semidrying oils. These generally have iodine numbers within the range from 10 or 20 and preferably 50 up to about 125. They show the phenomenon of drying but not to a degree sufficient to make them useful in paint and varnish. While cottonseed oil is in this class, it is not one of the best for the present purposes because of its excessive amount of linoleic acid. Among the non-drying oils which are the most useful for the present purposes is rapeseed oil, although other materials with the same general properties may be used such as the various mustard seed oils. While it is generally preferred to use rapeseed oil itself, not only because of its superior properties but also because of its availability and cost, still mixtures of other oils may be made up which approximate the properties of rapeseed oil. Among these cottonseed oil and fish oils make good bases and may be blended with palm or lard oils to approximate the properties of rapeseed oil. Castor and other hydroxylated oils do not polymerize in the same manner as the unhydroxylated materials described above and they are undesirable for the present purposes. Such hydroxylated oils are therefore outside of the scope of the present invention and are also excluded from the claims.

The present process differs from the polymerization used in the paint and varnish trade not only in that the reaction is carried out with the initial materials specified above which are of no substantial value in the paint art, but furthermore in that the polymerization is carried out initially to a greater degree than is used in the paint boiling art. Rapeseed oil, for example, is polymerized to a greater degree than tung or linseed oil during the present polymerizing process and at the same time remains freely soluble in hydrocarbon lubricating oils. The thickening power of the polymers of the molecular weight up to about 1000 is not sufficiently great to be of any material interest in the petroleum industry and it is necessary to produce oils of viscosities above 1,000 and preferably of the range from 2,000 to 3,000 molecular weight and higher for this purpose. These may be readily prepared from the oils of the classes described above by the process which will be disclosed below. These materials are still quite soluble in mineral lubricating oils and are further distinguished from the drying oil polymers in that they are relatively stable, and can be made stable to a very high degree as will be disclosed below. The drying oil polymers are characterized by a steady increase of molecular weight until the thickened or gelatinous films are produced, but this is not the case with the oil polymers with which this invention is concerned.

Referring to the drawing, numeral 1 denotes a charging pipe into which the oil or oil mixture to be polymerized is passed by means of a pump 2. The oil feed passes through a heating coil 3 and into the upper end of an elongated reaction vessel 4 which is adapted to withstand temperatures of about 500 to 700° F. while under a reduced pressure or vacuum. The vessel may be made of iron but preferably of nickel or Monel metal, or other non-corroding alloys. The lower portion of the vessel indicated at 4 holds the boiling oil while the upper part is fitted with means to separate and return entrained liquid. As an example of this means a trap 5 is shown on the vapor outlet pipe 6 which communicates with a cooler 7 and a separator 8. To the separator is connected a pump 9 which is used to produce and maintain the vacuum on the system.

From the lower end of the vessel 4 a pipe 10 is provided connecting with the entrance to the heating coil 3 and thus provides a cyclic path by which the oil is heated, passed into the vessel 4, withdrawn, reheated and returned.

The apparatus shown is intended to be operated in a batch method but if desired several, i. e. two or more such units may be provided in series, the initial oil flowing into the first then to the second and thence through the series to the end. A single vacuum system may be used for the entire series or, if desired, a single reaction chamber may be provided and divided into separate sections, for example in a spiral path, providing time for the slow flow of oil into and through the chamber so that it is polymerized to the desired degree when it leaves the vessel. The degree of polymerization may be controlled in such an apparatus by accurate control of the temperature of heating and by the rate of feed, the lower the temperature or the longer the oil remains in the apparatus the greater degree of polymerization will be effected.

The heating means illustrated in the drawing is a useful and satisfactory method, but it should be understood that this is not the only method that can be used. The chamber may be heated directly, if desired, or by a jacket through which the superheated steam, mercury or diphenyl vapors are circulated. Internal electric heaters may be employed and, in brief, any of the usual forms of heating equipment are suitable which supply heat at a uniform and controlled rate. Care should be taken against rises of temperature over about 600° F. as this produces too rapid polymerization and discoloring of the oil.

In the prior description something has been said as to the initial materials suitable for the present process. Rapeseed oil appears to be the best for its all around properties and the following description will deal mainly with this oil, but it should be remembered that other raw materials of the types described may be employed.

It is frequently desirable to add a substantial amount of a hydrocarbon oil to the fatty oil prior to or during polymerization, since this makes it easier to maintain the polymer in a soluble condition and prevents undue local overpolymerization. The amount of oil used may vary considerably, say from 10 to 60% more or less, and there is of course considerable latitude in the type of oil that may be used. It is preferable to use an oil of high boiling point in order that it will not be vaporized. The oil may have a viscosity above 50 seconds Saybolt at 210° F. up to the cylinder oil range, but oils of 50 to 100 at 210° F. are preferred. By the use of such oils polymers of the range of 3,000 to 7,000 seconds Saybolt at 210° F. may be readily produced without so great a thickening as to make handling difficult.

The temperature at which polymerization is accomplished is preferably between 500 and 600° F. and the rate of reaction increases very rapidly between these temperatures. With the more unsaturated oils slightly lower temperatures are desired than with the less unsaturated and the time of reaction varies with both the temperature and the degree of unsaturation of the oil, as well as with the molecular weight of polymer produced. By varying these factors the time may be varied considerably, for example from as short as 3 to 5 hours to 20 hours or more. Ordinarily it is preferred to adjust the factors so as to provide a time of 10 to 15 hours and in this way polymerization may be accurately controlled, but great care must be given during the last few hours as the rate of viscosity increase becomes quite rapid.

If the temperature is too high, the degree of polymerization may be greater than is best suited for lubricating oils and may actually go so far even with slowly-drying or non-drying oils as to produce rubbery or gelatinous materials which are insoluble in lubricating oils. Polymerization should not be allowed to proceed to this extent. If desired, small amounts of catalytic materials such as the heavy metal soaps may be added to the oil, but in general these are not required.

It has been found quite desirable to add small amounts of sulfur to the fatty oils prior to polymerization. The amount may be quite small but it is important to add this as sulfur is not ordinarily present in the fatty oils. As little as .01% to .02% has a decided effect on the oil, causing it to polymerize more smoothly and to prevent local formation of rubbery or insoluble materials. The effect of sulfur is also to make the product more soluble in lubricating oils and it is possible by this means to produce considerably more viscous oil soluble polymers than can be produced without the sulfur. The solubility of sulfur in oils is quite limited and it is preferred to use it within the limits of solubility, i. e. not to use suspensions of sulfur in the oil, although this can be done. The amount of sulfur is generally less than about one and one-half per cent. If too much sulfur is used, there is a darkening of the oil and solids deposit. Sulfur may be added in the form of flowers of sulfur as is preferably the case, but it may also be used in other forms. It is usually added before polymerization occurs or at least in the early stages of polymerization. Sulfur added after polymerization has proceeded to a substantial degree or after polymerization has been completed does not give the same good properties as if it were added at the start. The addition of sulfur has other advantages; for example, it causes an advantageous effect in reducing the oxidation rate of the mineral oil polymer blend and an increase in its stability, and prevents to a high degree the tendency to form skins.

When drawn from the reaction chamber, the polymerized product is a thick viscous liquid of good color and odor, ordinarily from a yellow to a light brown, with no indication of tar or solids. Naturally the color will depend on the initial material but on polymerization it should be darkened by only a few shades. A small amount of acid sometimes develops during the polymerization, especially where a very high vacuum is not obtained, and this may be removed by washing with soda, but preferably by adding to the polymer a small amount of a light hydrocarbon lubricating oil, such as a spindle or neutral oil, then heating and flashing the same in order to remove the mineral oil by vaporization and at the same time the acid materials are vaporized and removed, but if the vacuum maintained on the system is sufficiently high the acid can be maintained at so low a figure that the product is practically acid free.

The polymers may be used as produced except for the removal of acid as mentioned above, but the product may be refined by various methods if desired, for example, the heavy materials may be precipitated by the addition of organic liquid precipitants such as liquid propane or butane or alcohols, esters or ketones such as amyl or butyl alcohols, acetone or methyl ethyl ketones and the like. These precipitants may be employed alone or mixed with naphtha or aromatic hydrocarbons. By these means the parts of highest molecular weight may be separated. This process is much less necessary than it would be in contrast with other polymerization processes because of the much greater uniformity of molecular weight obtained by the present process. Nevertheless, the separation may be carried out if desired.

The present polymers themselves are quite different from polymerized products that have been previously produced and naturally their products depend somewhat on the particular oils which are polymerized. They have viscosities above about 2,500 seconds at 210° F. and the following inspections are given of two samples which may be considered typical of the products produced in polymerizing rapeseed and cottonseed oils respectively:

|  | I Rapeseed oil polymer | II Cottonseed oil polymer |
|---|---|---|
| Viscosity Saybolt sec. at 210° F | 6,550 | 5,000 |
| Acid No | 5.0 | 5.0 |
| Saponification No | 160 | 180 |
| Iodine No | 75.5 | 75 |

The polymers produced in the present manner may be advantageously blended with hydrocarbon lubricating oils to increase their viscosity and viscosity index. If this is the primary purpose, the amount of oil used should be from about 5 to 50%, but since the product is quite miscible more might be used for special purposes. As an example of this 5, 10 and 20% respectively of a given rapeseed oil polymer added to a 93 V. I. base oil raised the V. I. to 108, 115 and 126 respectively. The materials impart to the oil superior oiliness which can be demonstrated on any of the recognized oiliness machines. Another property of the oil is to reduce the tendency to form sludge in an automotive engine. In this manner Sligh values may be reduced considerably and this with only relatively small additions of the polymer, for example less than 5%. These polymers likewise have the property of modifying the crystal growth of paraffin wax and other crystalline organic materials, for example stearic acid, in waxy mineral oils so as to depress the pour point by as much as 40 or 50° F. depending on the susceptibility of the oil and the particular polymer used. For this purpose less than 5% of the oil polymer is effective. The property of these oils of modifying the crystal structure becomes apparent when the molecular weight of about 1,000 is reached and is more pronounced as molecular weight is higher. The polymer oils may also be utilized in the separation of wax from oils either by filtration, sedimentation or centrifugal action. Small amounts of the polymer when added to the waxy oils greatly increase the rate at which the oil may be chilled and the ease of separation. Indeed many samples of oil which will not settle on standing for very long periods rapidly separate into oily and waxy layers under the influence of a small quantity of the polymer.

The following examples are given to illustrate the methods for producing the present polymers, their properties and uses:

*Example I*

Rapeseed oil was heated to 600° F. and maintained for prolonged periods at that temperature. At periodic intervals samples are taken off and Saybolt viscosity at 210° F. determined. In test No. 1 the pressure was atmospheric and in No. 2 it was maintained at 5 mm. of mercury.

| Time, hours | Viscosity Saybolt sec. at 210° F. | |
|---|---|---|
|  | No. 1 | No. 2 |
| 0 | 60 | 60 |
| 4 |  | 200 |
| 8 |  | 700 |
| 10 |  | 1750 |
| 12 | 140 |  |
| 20 | 155 |  |
| 27 | 165 |  |

This shows the sharp difference between polymerization at ordinary and at reduced pressures.

*Example II*

Rapeseed oil was polymerized at three different temperatures and under 5 mm. mercury pressure. Viscosity was measured at intervals as before:

| Time, hours | Viscosity Saybolt sec. at 210° F., temperatures— | | |
|---|---|---|---|
|  | 575–590° | 590–600° | 600–610° |
| 2 | 65 | 76 | 105 |
| 4 | 75 | 105 | 190 |
| 6 | 91 | 160 | 350 |
| 8 | 120 | 270 | 720 |
| 12 | 250 | 1,000 | 10,000 |
| 16 | 750 | 7,000 |  |
| 20 | 6,000 |  |  |

These runs illustrate the sharp effect of temperature and the rapid rate of viscosity increase during the last few hours.

*Example III*

Rapeseed oil was mixed 1 to 1 with an SAE 50 lubricating oil and then heat thickened at 575° F. and under high vacuum until a product of approximately 1,000 vis. at 210° F. was obtained. The actual viscosity was 990 Saybolt sec. at 210° F. This was then added in 10% concentration to a well refined mineral lubricating oil. The inspections of the oil and the blends are given below:

|  | Oil | Oil and 10% polymer |
|---|---|---|
| Viscosity at 100° F | 520 | 681 |
| Viscosity at 210° F | 65 | 81.5 |
| Viscosity index | 98 | 116 |
| Color | 4½ | 4½ |
| Carbon, percent | .31 | .44 |
| Pour | 15° F. | −30° F. |

This illustrates the blending value of the polymer, also its power to reduce the pour point of the oil

*Example IV*

To test the heat stability of the polymer a product obtained by polymerization of a 1 to 1 mixture of rapeseed oil and an SAE 30 Panhandle was heated for 18 hours at 338° F. The viscosity before the test was 1,550 sec. Saybolt at 210° F. and after the test was 1,540 sec.

A blend of lubricating oil (SAE 50) and 10% of a polymer made from straight rapeseed oil was submitted to the same test. The blend had an original viscosity of 103.4 sec. at 210° F. and after 18 hours at 338° F. showed 100.4 sec.

Example V

To show the pour reducing properties of the polymer various amounts were added to the same oil with the results shown. The original oil had a pour point of 30° F.

| Inhibitor | Pour point of blend percent inhibitor | |
|---|---|---|
| | 1.0 | 1.5 |
| Polymer of 1:1 rapeseed oil and SAE 50 mineral oil | °F. −10 | °F. −20 |
| Polymer of rapeseed oil | −20 | −25 |

Example VI

Actual tests in a C. F. R. engine were made with blends of the present polymers and the oil consumption was carefully measured. In addition the engine was taken down after the test and its condition rated according to a regular procedure, the lower the number the better the engine condition. The amount of carbon was then determined. As a blank a test was made of a blend of the same oil with 10% of a commercial polymer produced by voltolization of a fatty oil. The particular polymer of the type described herein was produced from a blend of 50% rapeseed oil and 50% a red lubricating oil, to which .3% of free sulfur had been added. This blend will be designated A and the voltol polymer blend B. During the 14 hour tests .41 qt. of A was consumed compared to .64 qt. of B. The piston demerit rating of A was 1.15 and B 1.22. In both tests the crankcase was in excellent condition. The blends are equally rated as to varnish on the piston skirt and carbon under the pistons. One ring was slightly stuck in the A test and all were free in B test. The carbon formed was 1.21 gr. in A and 1.17 in B. On the whole they were closely comparable with no marked advantage one way or the other.

Example VII

Runs similar to those of the previous example were made on two unblended mineral oils and on these same oils to which polymers were added. The demerit ratings of the pistons were determined according to a definite procedure.

| Oil | Piston Demerit |
|---|---|
| Reference oil A (unblended) | 4 to 5 |
| Reference oil A+10% vacuum thickened rapeseed oil (no sulfur added) | 3.74 |
| Reference oil B (unblended) | 3.2 |
| Reference oil B+10% vacuum thickened rapeseed oil (0.5% sulfur added) | 1.79 |

The last sample contained .5% sulfur which had been added to the fatty oil before polymerization. The engine condition after this run was particularly excellent with no deposit of sludge whatever.

Example VIII

The following tests were made on different oils to show the quality of the polymer produced:

| Oil sample | Temp., °F. | Pressure, mm. | Time, hours | Viscosity of polymer |
|---|---|---|---|---|
| Cottonseed | 580 | 10 | 20 | 13,720 |
| Rapeseed | 580 | 10 | 20 | 6,550 |
| Do | 580 | 10 | 12 | 3,500 |
| Menhaden | 570 | 5 | 6½ | 4,000 |
| 50% rapeseed 50% SAE 50 mineral oil | 590 | 5 | 14 | 990 |
| 50% rapeseed 50%—62 vis. at 210 mineral oil added slowly | 590 | 5 | 16 | 1,200 |

Example IX

The effect of the polymer on a modified Sligh determination is shown by the following tests in which 10% of various rapeseed oil polymers produced already by the present method were added:

| Viscosity at 210 of polymer | Modified Sligh determination |
|---|---|
| 850 | 11.5 |
| 1,369 | 18.2 |
| 6,300 | 11.0 |
| 10,000 | 6.1 |

The oil itself showed a modified Sligh value of 24.0.

The present invention is not limited to any theory of the reaction nor to any particular oil but only to the following claims in which it is desired to claim all novelty inherent in the invention.

We claim:

1. A polymer of a semi-drying oil, light in color, miscible with mineral lubricating oil, containing a small amount of sulfur, having a viscosity of at least 1,500 seconds Saybolt at 210° F. and having the property of reducing the pour point of waxy mineral oils when added therto.

2. A polymer of rapeseed oil, light in color, substantially free of acidity, containing from about .01% to about .5% sulfur, freely soluble in mineral oils, having a viscosity of at least 3,000 seconds Saybolt at 210° F. and having the property of reducing the pour point of waxy lubricating oils when added therto.

3. A polymerized semi-drying oil, having a viscosity in excess of 1,000 seconds Saybolt at 210° F., miscible with mineral lubricating oils, having the property of reducing the pour point of waxy mineral oils when added thereto and prepared by subjecting the oil to prolonged heating at a temperature from about 500° to 700° F., while in absence of oxygen.

4. A polymer of rapeseed oil having a viscosity above 1,000 seconds Saybolt at 210° F., freely soluble in mineral lubricating oils and capable of reducing the pour point of waxy mineral oils when added thereto and prepared by prolonged heating of the oil at a temperture between 500° and 700° F. while under reduced pressure.

5. A lubricating composition comprising a mineral lubricating oil and a polymer of a semi-drying oil, said polymer having a viscosity above 1,000 seconds Saybolt at 210° F., being freely soluble in the mineral oil and being capable of reducing the pour point of waxy mineral oils when added thereto and prepared by subjecting the unpolmerized oil to prolonged heating at a temperature from 500° to 700° F. while under vacuum.

6. A lubricating composition comprising a waxy lubricating oil having normally a relatively high pour point together with a polymer prepared by subjecting a semi-drying oil to prolonged heating under vacuum, said polymer being further characterized by a viscosity in excess of 1,000 seconds Saybolt at 210° F., being completely miscible with the mineral oil and in proportion to reduce the normal pour point of the oil.

7. A polymerized oil according to claim 3 in which the polymer contains a small amount of sulfur.

8. A polymer according to claim 4 prepared by heat treatment in the presence of a small quantity of sulfur.

9. A composition according to claim 6 in which the polymer is produced by the heat treatment in the presence of a small amount of sulfur.

PER K. FROLICH.
JONES I. WASSON.